Figure 1:
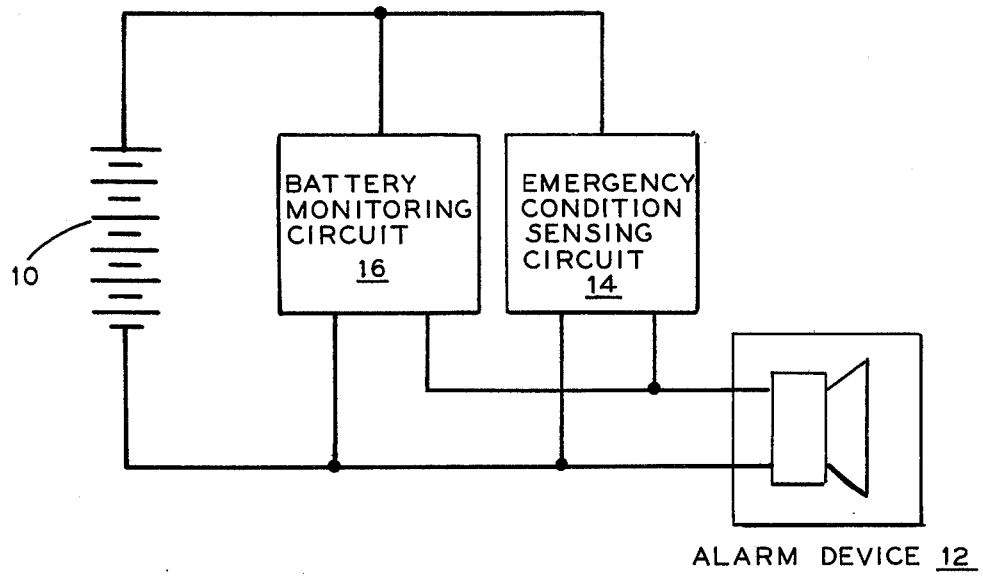

United States Patent [19]

Fagan, Jr. et al.

[11] 4,025,700

[45] May 24, 1977

[54] VARIABLE PRECISION MULTIVOLTAGE STEP BATTERY

[75] Inventors: Franklin G. Fagan, Jr., Ossining; Stephen J. Angelovich, Yonkers, both of N.Y.

[73] Assignee: P. R. Mallory & Co., Inc., Indianapolis, Ind.

[22] Filed: Oct. 20, 1975

[21] Appl. No.: 624,071

Related U.S. Application Data

[63] Continuation of Ser. No. 458,257, April 5, 1974, abandoned.

[52] U.S. Cl. .................................. 429/91; 429/218; 429/222
[51] Int. Cl.² ........................................ H01M 6/00
[58] Field of Search ............... 136/3, 20, 6 R, 182, 136/24, 30, 28, 107, 83 R; 317/231; 320/48; 340/287, 249; 429/91, 218, 222, 149

[56] References Cited

UNITED STATES PATENTS

| | | | |
|---|---|---|---|
| 2,942,052 | 6/1960 | Bourke et al. | 136/6 R |
| 3,520,729 | 7/1970 | Voss et al. | 136/20 |
| 3,757,793 | 9/1973 | Fester | 136/111 X |
| 3,781,657 | 12/1973 | Dennstedt | 136/182 X |
| 3,827,916 | 8/1974 | Fagan, Jr. | 136/20 |

*Primary Examiner*—Anthony Skapars
*Attorney, Agent, or Firm*—Ronald S. Cornell; Israel Nissenbaum; Charles W. Hoffmann

[57] ABSTRACT

To provide an indication that a predetermined amount of the energy of a cell has been used up, the positive electrode is formulated with two or more ingredients having different electrochemical potentials relative to the negative electrode. As each ingredient is used up, the voltage between the electrodes drops to the next potential difference, thereby indicating a predetermined quantity of energy has been used, and that the remaining reserve is at or less than the amount at which the voltage is predesigned to drop.

The use of such a step voltage cell in a battery provides a measure of the condition of the battery when the voltage drops, due to the voltage drop in such pilot cell.

2 Claims, 3 Drawing Figures

ALARM SYSTEM BATTERY DISCHARGE CHARACTERISTICS

ALARM SYSTEM BATTERY DISCHARGE CHARACTERISTICS

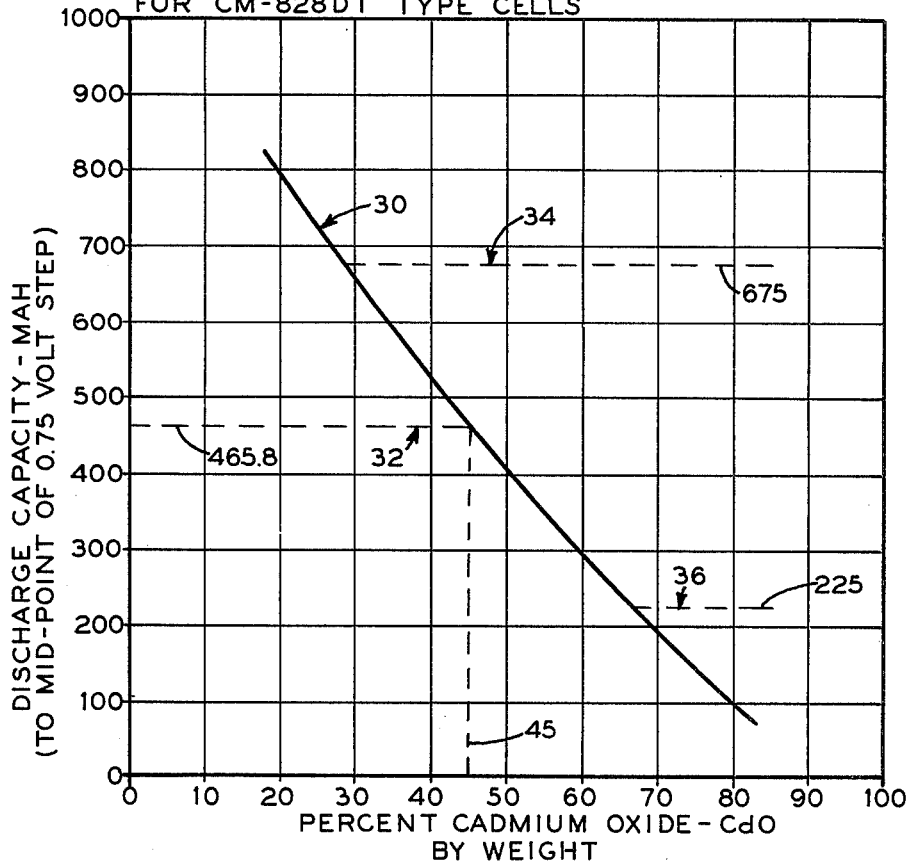

VARIABLE PRECISION MULTIVOLTAGE STEP BATTERY

This is a continuation of application Ser. No. 458,257, filed Apr. 5, 1974, now abandoned.

This invention relates to electric cells and particularly to a novel cell which will, by itself, provide an indication that it has reached a predetermined selected point or level in the discharge of its initial energy capacity, to indicate thereby, the quantity of energy reserve still available.

The invention further relates to a battery of electric cells, in which the novel cell of this invention may be combined with one or more conventional cells, to provide a battery in which the novel cell will indicate that the battery as a whole is near the end of its normal effective life.

Such a cell, or such a battery, has general utility and application. In many applications, the end of life of a cell or of a battery will not have any special detrimental effect; and the replacement of a new cell or battery may be made at will.

In many other applications, however, where reliance is placed on the battery for continuous operability and availability, the condition of the cell or the battery must be known, so a suitable replacement may be made if the cell or battery should become depleted to a degree where it cannot funcion as intended.

One such application of use, for such a cell or battery, is in a supervisory or alarm system, where the cell or battery must always have sufficient reverse energy to operate an indicator or actuator. It is therefore important that the cell or battery as an energy source, be always ready to function; and, therefore, that the energy condition of the cell or battery be indicated, so a substitution may be made, if necessary, to preserve the integrity of the system.

One object of the invention is to provide an electric cell that will have a series of successive decreasing stepped voltages between its terminals, as the energy of the cell is gradually depleted, to provide an indication of the condition of the cell as a measure of the amount of energy still in reverse in the cell.

Another object of the invention is to provide a battery of several conventional cells, with one modified cell having a decreasing stepped voltage characteristic as a measure of the amount of energy still in reverse in the cell, with the modified cell having a predetermined energy relationship to one of said conventional cells, so the voltage of the battery will be modified by the changing step voltage of the modified cell, to provide an indication of the condition of the battery as a whole, as a measure of the amount of energy still available in the battery.

Another object of the invention is to provide an electric cell with one or both electrodes constructed to embody several different ingredients to establish different electro-chemical potentials as each of the ingredients in succession is electro-chemically used up and converted into electrical energy.

Another object of the invention is to provide an electric battery of several cells, one or more of which may be constructed to achieve a drop in potential between the electrodes after a predetermined amount of original energy has been converted from the battery, so the overall drop in voltage of the battery will indicate that the condition of the battery is at a level that requires substitution of a new battery.

Another object of the invention, in the modified cell, is that the proportions of the constituents shall be preporportioned to predetermine the duration or extent of each voltage step during the discharge operation of the cell.

Another object of the invention, where one modified cell, or more, will be used with one or more conventional cells, is to combine the several constituents of the modified electrode of a modified cell, so they will have the same quantity of electrical energy as in a corresponding conventional electrode of a conventional cell, so the discharge rates and the discharge time durations will be substantially as similar and equal as possible.

To illustrate the nature and utility of the invention, it is shown in one mode of operation as applied in use with an alarm system. Conventional alarm system batteries consist of a number of similar cells connected in a series arrangement to achieve the battery terminal voltage required for a given application. This battery supplies continuous power to the alarm system sensing circuit; such as, for example, a smoke detection device, a temperature sensing device, or a breathing rate sensing device. Generally, the continuous power required to activate the sensing circuit is at a modest low level, and consequently, the current delivery capabilities required of the battery are also at a modest level, e.g., 20 to 75 microamperes. However, an additional requirement imposed on the battery is that when the sensing circuit detects an emergency condition, the battery must supply adequate power to activate the alarm device; such as, for example, an audible horn, buzzer, etc. Generally, the power required to activate the alarm device is many times that required to activate the sensing circuit, and the current delivery capabilities required of the battery are similarly increased, e.g., 50 to 75 milliamperes, a quantity that is one thousand times that for the sensing circuit. Therefore, in any given application, the selection of battery size, capacity, and current delivery capability is dictated by the greater requirements of the alarm device.

In the operation of such alarm systems, with continuous discharge of the battery powering the sensing circuit, a time is reached near the end of battery life, when, although still supplying the modest power required by the sensing circuit, the battery, due to its near exhaustion, is incapable, if called upon, of supplying adequate power to activate the alarm device. Thus, at that time, a malfunction could occur with potentially disastrous results, because of no warning of the battery condition that would have alerted a supervisor of the need for a replacement.

The present invention overcomes this possibility of malfunction without prior warning, by producing in the battery, a characteristic, which, when continuously monitored by the alarm system, will indicate that the battery is nearing its end of life, and that characteristic will activate the alarm device. A separate alarm device may be employed for this end-of-life warning, or the alarm mode, to indicate end of battery life, can be conveniently differentiated from the emergency condition mode, for example, by using an intermittent signal as contrasted with a continuous signal. Thus, the time and need for battery replacement will be indicated well in advance of battery failure due to exhaustion, and at such a time while there is still remaining in the battery sufficient reserve capacity even to power the alarm device, for an adequate time period, in the event of an emergency condition, to permit appropriate battery substitution to be made.

According to this invention, the battery indicates the approach of its end of life condition, to the alarm system battery monitoring circuit, by an abrupt controlled decrease of the battery terminal voltage, and does so at a predetermined time well in advance of battery exhaustion, according to design. This voltage decrease is accomplished by modifying the positive electrode formulation of 1 or more of the cells of a multicell battery.

The invention has been demonstrated, for example, by modifying a Mallory Battery Company cell, whose standard positive electrode formulation is 89 percent mercuric oxide (HgO), 6 percent manganese dioxide ($MnO_2$), and 5 percent graphite (C) and whose rated capacity is 900 milliampere hours. The desired voltage step, according to the invention, i.e. decrease of 0.75 volts from approximately 1.25 volts to approximately 0.50 volt, in one cell, or in more than one, where so desired, can be caused to occur after the discharge of 465 milliampere hours of cell capacity, by substituting a new positive electrode whose formulation is 45 percent mercuric oxide, 3 percent manganese dioxide, 45 percent cadmium oxide (CdO), and 7 percent graphite.

The electro-chemical principle established and employed here is to control the functioning of this special positive electrode formulation in the advantageous manner described, by intimately mixing two or more electro-chemically active material and compressing them into a common elctrode, so that when such an electrode is discharged against an opposing electrode, the discharge proceeds first to exhaust completely the active material having the highest relative potential against the opposing electrode, and then, in stepwise fashion, the discharge proceeds to exhaust completely, the materials having successively lower potentials.

Thus, in the special modified cell of this invention, the 3 percent manganese dioxide and the 45 percent mercuric oxide fractions of the positive electrode discharge against a zinc (Zn) negative electrode in the voltage range 1.36 volts to 1.25 volts, until they are substantially exhausted. Then the battery terminal voltage falls abruptly from approximately 1.25 volts to approximately 0.50 volts. Finally, the 45 percent cadmium oxide fraction discharges against the zinc negative electrode in the voltage range 0.50 volts to 0.40 volts, until the cadmium oxide is substantially exhausted.

In the example cited, the voltage step has been designed to occur at 465 milliampere hours discharge capacity of 51.7 percent of the 900 milliampere hours cell rated capacity. However, by readjusting the relative percentages of mercuric oxide, manganese dioxide, and cadmium oxide in the formulation, the voltage step can be designed to occur at any discharge capacity desired with an accuracy of plus or minus 5 percent. A discharge capacity in the range of 225 milliampere hours to 675 milliampere hours, or 25 percent to 75 percent of rated capacity, appears to satisfy the majority of presently contemplated applications.

It should be noted that the special cell, or cells, here used to introduce the voltage step in the discharge characteristic of the alarm system battery, will satisfy an important and necessary requirement of multicell battery design. This requirement is that, in a series connected multicell battery, all cells should have approximately the same total discharge capacity, or energy content. This is necessary so that, as the battery nears end of life, all of the cells will reach exhaustion as nearly as possible at the same time. If there is substantial disparity in end of life capacity, then any cell which reaches exhaustion first will fall to zero voltage, and, if the discharge current then continues, due to the continued discharge of the other cells with energy capacity remaining, then the voltage of the exhausted cell will be reversed. Such reversal of cell voltage is damaging to the battery if continued more than a very short time. The reversal generally results in the electrolysis of the water constituent of the electrolyte, the evolution of hydrogen and/or oxygen gas, an increase in internal cell pressure, and ultimately rupture of the sealed container for the cell, with possible electrolyte leakage and possible attendant damage to the alarm system.

Therefore, in a battery of this invention, including one or more modified cells of this invention working with standard conventional cells, the modified cells of this invention are formed so the total active electro-chemical capacity of the three active positive electrode constituents, i.e., mercuric oxide, manganese dioxide, and cadmium oxide, will be approximately equal to the total active electro-chemical capacity of the positive electrodes of the other standard cells of the battery, regardless of the relative proportions of each constituent. In the design of cells of this type, the electro-chemical capacity of the negative electrode, in this instance zinc, is maintained in balanced relationship and slightly less than that of the positive electrode, and is therefore uniformly capacity-limiting both for the special modified cells and for the standard cells. Thus, even if the battery comprised of both types of cells is discharged to exhaustion, all cells, standard and modified, will reach exhaustion as nearly as possible at the same time. Additionally, if the battery user replaces the battery well in advance of exhaustion in response to the end of life warning signal, then all difficulties arising from overdischarge will be completely avoided.

Although the example given by this invention demonstrates the introduction of a single 0.75 volt step in the discharge characteristic of a cell, it will be realized that a large variety of stepwise decreases can be introduced in the discharge characteristic of a cell, or of a multicell battery, at desired predetermined capacity, and therefore time intervals by adjustment of the positive electrode composition of selected cells of the several cells comprising such battery.

Figure 2:
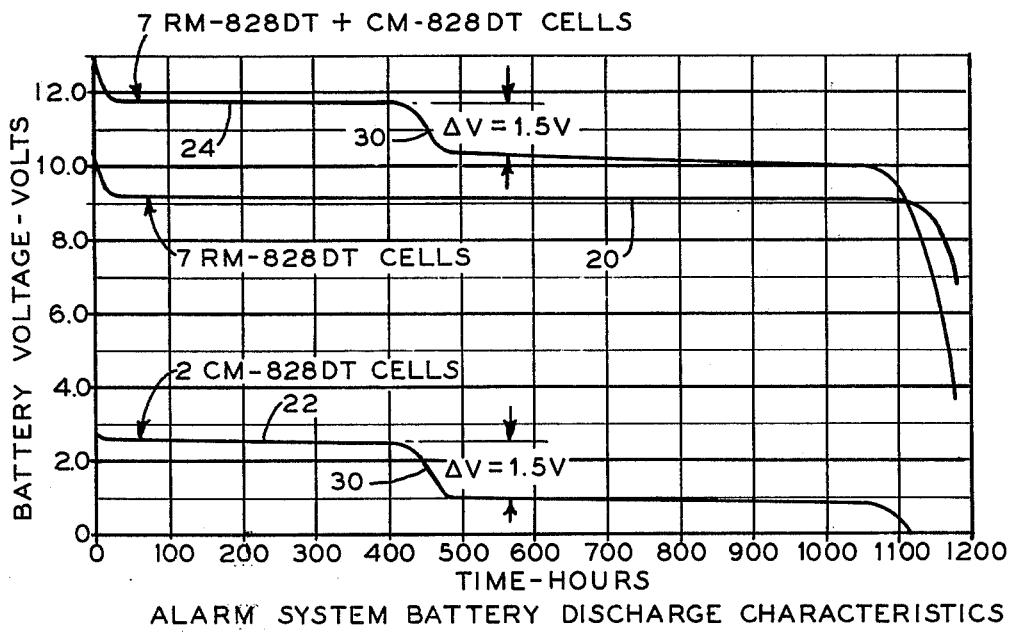

The operation of a modified cell or battery is illustrated in the accompanying drawings, in which FIG. 1 shows the schematic relationship of the alarm system sensing circuit, alarm device, battery monitoring circuit, and battery;

FIG. 2 shows a typical alarm system battery discharge characteristic for a battery comprised of 7 (RM-828DT) Mallory Battery Company standard cells and 2 special modified (CM-828DT) Mallory Battery Company cells in series. This is an accelerated discharge test conducted at a 1.0 milliampere nominal discharge rate. The actual alarm system sensing circuit will discharge the battery at a 50 microampere rate for approximately one year before signaling the need for battery replacement; and FIG. 3 shows, for the CM-828DT cell, the milliampere hour discharge capacity at which the mid-point of the voltage step occurs as a function of the percent cadmium oxide in the positive electrode.

The invention, in one aspect, is directed to an electric cell constructed to show a sudden and substantial drop in voltage between its terminals when the energy content or capacity of the cell drops to or below a specific predetermined level at which the energy content may not be enough to operate a device for which the battery is to serve.

In a second aspect, the invention is directed to a multi-cell battery, in which one or more modified cells of this invention are employed as a group, or in which one or more modified cells are employed with a group of conventional cells. In a battery in which conventional cells are employed, the modified cell serves to provide the sharp drop in voltage to indicate the condition of near end-of-life for the battery, so a new battery may be substituted. As indicated above, the time and the extent of the voltage drop are controlled by the amount and electrochemical relationship of the ingredients employed to construct and constitute the positive cell electrode.

FIG. 1 of the drawings illustrates a typical generalized system, in which the modified cell, or modified battery, may be employed. A multi-cell battery 10 is shown, provided to operate an alarm device 12 when a condition-sensing circuit 14 responds to a condition being monitored. For that purpose, the sensing circuit 14 is shown merely as a technological black box, which includes a suitable condition-sensing system to perform predetermined operations and to operate a circuit closing switch or relay when the supervised and monitored condition to be sensed, actually occurs.

Since the condition that is monitored, and to be sensed, is critical to the desired operation of sounding the alarm, the ability of the battery to function and to operate the alarm device 12, when called upon by the condition-sensing circuit, is also critical. Therefore, the battery 10, also, must be monitored. This battery-monitoring circuit 16 embodies, essentially, a voltage-responsive relay or switch, that is held open so long as the battery voltage exceeds a predetermined level. When the battery voltage drops to or below some predetermined voltage value, that low voltage indicates the battery must be replaced, and the battery-monitoring circuit 16 will operate to energize the alarm device 12 to indicate the battery needs attention. Obviously, a separate alarm device could be used.

As long as the battery 10 is in condition with enough energy to operate the emergency condition-sensing circuit 14 and its components, the battery-monitoring circuit will remain at rest. The condition-sensing circuit 14 will be free and available to function upon occurrence of the condition being monitored. The system in box 14 will function and indicate that operation by energizing the alarm 12. As previously indicated, the condition-sensing system 14 can be controlled to send a signal of one type, such as a continuous signal, to the alarm device 12; and the batery-monitoring circuit 16 can be controlled to send an intermittent signal to the alarm device 12. The circuitry for the two types of signals is not part of the invention, and is well within the skill of the artisan. As stated, two separate alarm devices may be employed.

The manner in which a battery functions, in accordance with this invention, is shown in FIG. 2. Curve 20 represents a battery of seven conventional Mallory Battery Company cells of the RM-828DT type. Under normal conditons, with minimum low drain, the battery voltage would remain steady at the level shown in curve 20 for a life of some 1100 hours, with a load resistance of suitable value to hold the drain down to about 1.0 milliamperes in the detection or condition-sensing circuit 14, of the system in FIG. 1. The alarm device 12 in the system shown might take about 50 milliamperes.

In certain applications, there may be little concern about receiving the usefulness of the battery over its possible full life as shown in curve 20. For such an application, for example, it is desired to know when a certain amount of energy has been withdrawn and used. Inversely, of course, that would also imply the amount of energy still in reserve. But primarily, the safety factor is the important one, that will show that a predetermined amount of energy has already been withdrawn from the battery.

For that purpose, a voltage drop in the battery is made to occur, when the predetermined amount of energy has been withdrawn. To accomplish that, this invention is utilized to provide the voltage drop stem, as shown in curve 22 of FIG. 2, by two modified cells in this case, which are combined in a battery with the seven regular cells contemplated in the battery for curve 20, to provide the ultimate battery of this invention to operate as shown in curve 24 of FIG. 2.

As explained above, the positive electrode is formed with a formulation containing manganese dioxide, mercuric oxide and cadmium oxide. The managanese dioxide is converted first, and then the mercuric oxide, leaving the cadmium oxide as the remaining energy component of the positive electrode of the cell, with the cell voltage down to the neighborhood of 0.5 or 0.6 volt per cell.

With a battery composed, for example, of the seven regular cells, with voltage curve 20, and the two cells of curve 22, the composite voltage of the battery provides the voltage curve 24. The drop step in voltage represents the time when the manganese and mercuric oxide have been chemically converted and their energy extracted.

FIG. 3 shows how the voltage step load line characteristic 30, of a cell of this invention, may be utilized to relate the quantity of certain predetermined useful discharge energy of the cell to the percentage quantity of cadmium ingredient in the electrode that will cause the step voltage 30 to occur as an indication that the predetermined amount of desired energy has been withdrawn.

Thus, where the cell is desired to provide a predetermined assured output of 456.8 milliampere hours from the cell, indicated by broken line 32, with the discharge capacity load line 30, operative for step voltage indication for a discharge between 675 and 225 milliampere hours from the cell, as indicated by broken line 34 and 36, the percentage of cadmium oxide to be included as an ingredient of the positive electrode is 45% by weight. Thus, the other ingredients will make up 55% of the total weight of the electrode, and will assure enough energy content in the cell to make the predetermined desired withdrawal quantity available before the step voltage drops within the range to the value indicative of need to replace the cell.

The step voltage load line 30, of FIG. 3, corresponds to the step voltage line identified in FIG. 2, as part of curves 22 and 24.

Thus, a cell made according to this invention will have the positive electrode formed from a homogeneous mixture of the selected ingredients, in this case indicated by way of example, as mercuric oxide, manganese dioxide, cadmium oxide and graphite. The mercuric oxide and manganese dioxide will be first converted at the higher voltage steps, until only the cadmium oxide is left, plus the graphite filler. Then the cell voltage will drop to the voltage difference between the cadmium oxide and the negative electrode, along the voltage drop line 30. The locus of the voltage drop can thus be varied and controlled by the percentage of cadmium oxide include in the electrode mix; and the amount of assured energy available for discharge is a function of the amount of the other ingredients of the cell. Since all of the cells, — both conventional and those constructed to embody this invention, — will be designed to have the same original capacity or energy content, the preselected initial draw-off will be assured from the total battery before the step voltage of the modified cells indicates the need for replacement.

Different ingredients may be selected, according to the voltage desired, and the quantities of ingredients may be varied, according to the energy desired to be withdrawn, to determine the point of the curve at which the voltage step will occur to indicate need for cell or battery replacement.

The invention is thus not limited to the ingredients or their percentages as shown, since they may be modified within the spirit and scope of the claims without departing from the invention.

What is claimed is:

1. A battery comprising series connected electric cells each having substantially the same electrical discharge capacity and operating life time, wherein all of the series connected electric cells include first electrodes with the same sole active material and a substantially fixed electrical potential over the operating life time of the battery and at least one cell but not all of the series connected electric cells includes a second electrode composed of a plurality of different active materials; the materials of the second electrode having different electrical potentials relative to the fixed electrical potential of the first electrode, the chemical energy of the material of the second electrode having the highest relative potential against the first electrode being substantially converted to electrical energy prior to conversion to electrical energy of the chemical energy of any other material of the second electrode, the conversion of the higher potential material to occur under a current discharge condition which is substantially constant, the change from conversion to electrical energy of the chemical energy of the higher potential material to conversion to electrical energy of the chemical energy of the lower potential material to occur at a predetermined time during the operating life of the battery, the change to result in an abrupt voltage drop of about 0.75 volt for each of the cells having an electrode with a plurality of different materials thereby creating a significant voltage difference in the battery terminal voltage at the predetermined time, the terminal voltage difference adapted to be useful when continuously monitored to indicate need for time related action, the electrochemical capacity of the first electrodes in all of the cells in the battery being substantially the same as each other and slightly less than the electrochemical capacity of the second electrodes in any of said cells, and wherein the second electrode of each of the electric cells having a second electrode with a plurality of different materials inculdes HgO and CdO.

2. The battery as claimed in claim 1 wherein the second electrode of the at least one cell contains, at least as one ingredient, the same chemically active material as the second electrode of the other cell or cells.

* * * * *